United States Patent [19]
Eveleth

[11] Patent Number: 5,247,851
[45] Date of Patent: Sep. 28, 1993

[54] SNOW BLOWER WHEEL DISCONNECT

[76] Inventor: Kempton A. Eveleth, P.O. Box 881, Raymond, Me. 04071

[21] Appl. No.: 925,130

[22] Filed: Aug. 6, 1992

Related U.S. Application Data

[62] Division of Ser. No. 681,743, Apr. 8, 1991, Pat. No. 5,163,527.

[51] Int. Cl.$^5$ .............................................. G05G 1/04
[52] U.S. Cl. ........................................ 74/526; 254/104
[58] Field of Search .................... 254/104; 29/253; 192/93 R, 67 P, 89 A

[56] References Cited

U.S. PATENT DOCUMENTS

| | | | |
|---|---|---|---|
| 212,230 | 2/1879 | Johnston | 254/104 |
| 1,703,521 | 2/1929 | Dremel . | |
| 1,734,718 | 11/1929 | Donald . | |
| 1,779,583 | 10/1930 | Blydenburgh . | |
| 2,547,695 | 4/1951 | Eaglesfield . | |
| 3,251,630 | 5/1966 | Astley . | |
| 3,512,325 | 5/1970 | Nichols | 254/104 |
| 4,144,944 | 5/1979 | Aplin, Sr. . | |
| 4,516,670 | 5/1985 | Sorensen, Jr. . | |
| 4,586,235 | 5/1986 | Benvenuto | 29/253 X |
| 4,836,320 | 6/1989 | Sundin . | |
| 4,895,210 | 1/1990 | Witzel . | |

Primary Examiner—Richard A. Schacher
Attorney, Agent, or Firm—Jacobson, Price, Holman & Stern

[57] ABSTRACT

A driven shaft is provided having a free end portion upon which a drive wheel is mounted for rotation relative to the driven shaft and for shifting longitudinally therealong between first and second positions. Drive structure is provided for drivingly connecting the driven shaft to the wheel when the wheel is in the first position thereof and which ineffective to maintain the drive connection between the shaft and the wheel when the wheel is in the second position thereof. Structure is provided for yieldingly biasing wheel the wheel toward the first position thereof and the wheel shaft include axially spaced abutment surfaces between which the narrow end of an elongated wedge is disposed, the elongated wedge being mounted from the shaft for longitudinal shifting of the wedge radially of the shaft. When the narrow end of the wedge is disposed between the abutment surfaces the wheel is in the first position thereof and when the wedge is shifted radially of the shaft to wedge the abutment surfaces apart the wheel is displaced toward the second position thereof.

6 Claims, 3 Drawing Sheets

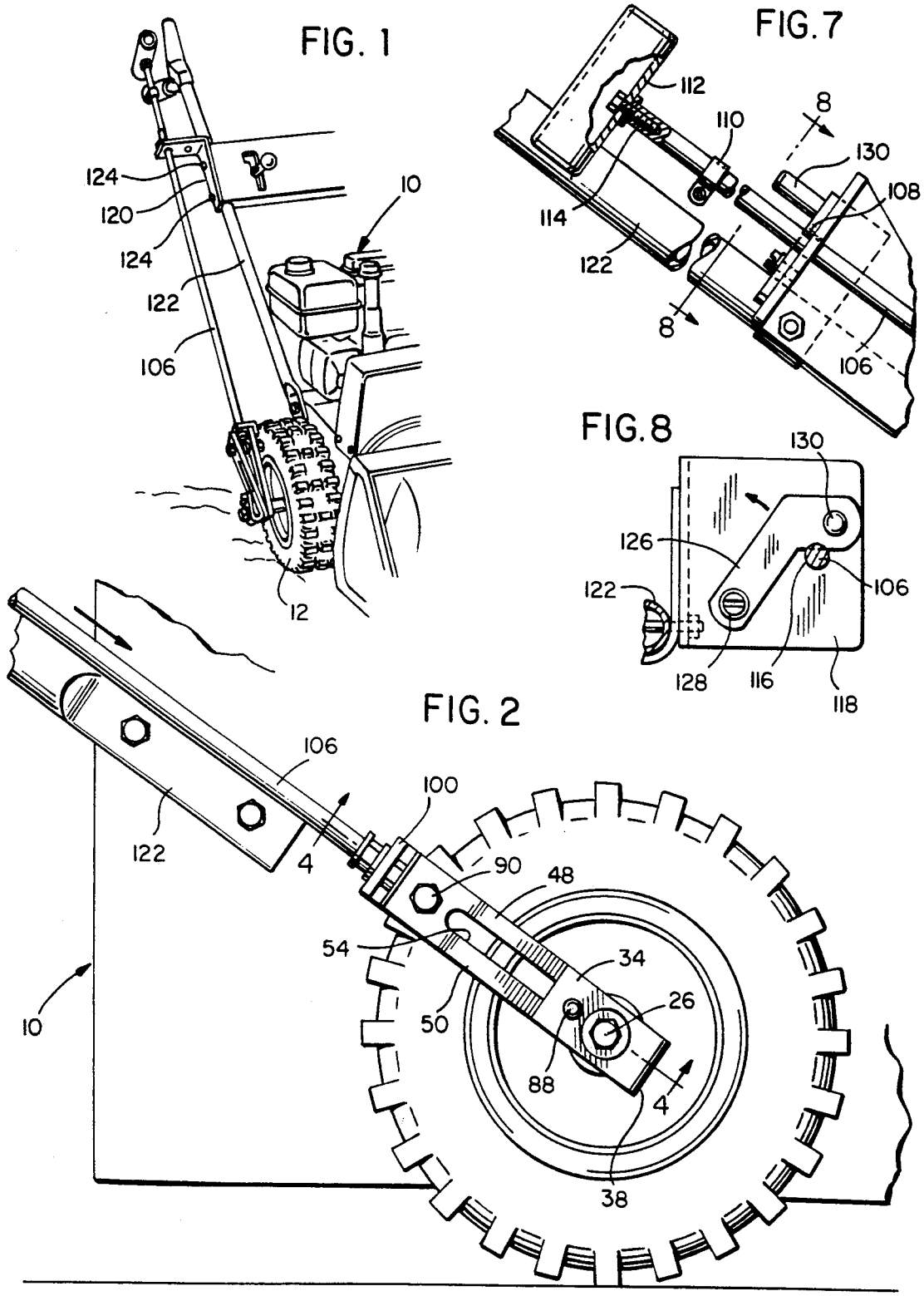

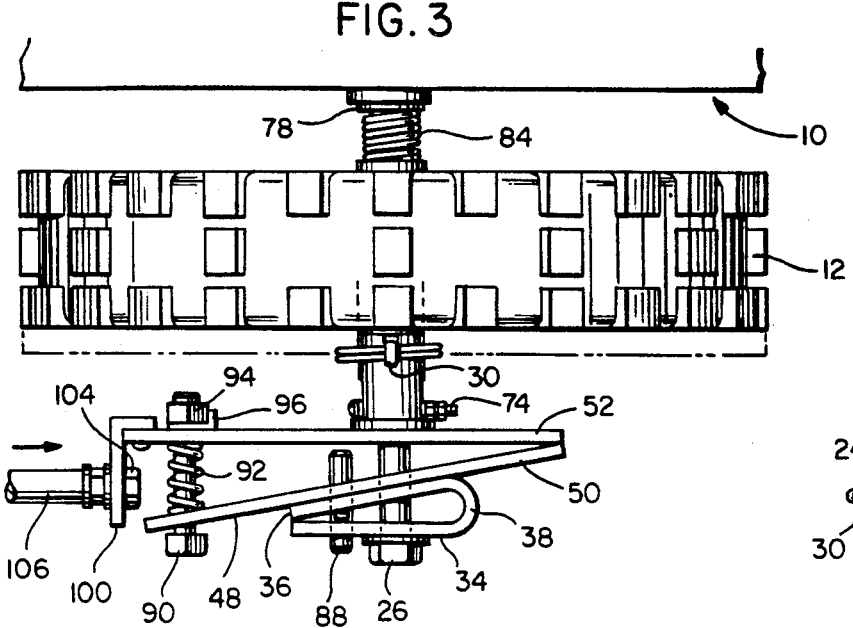
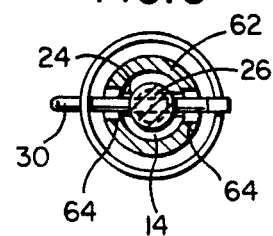
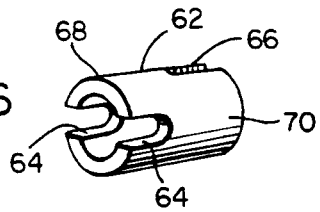
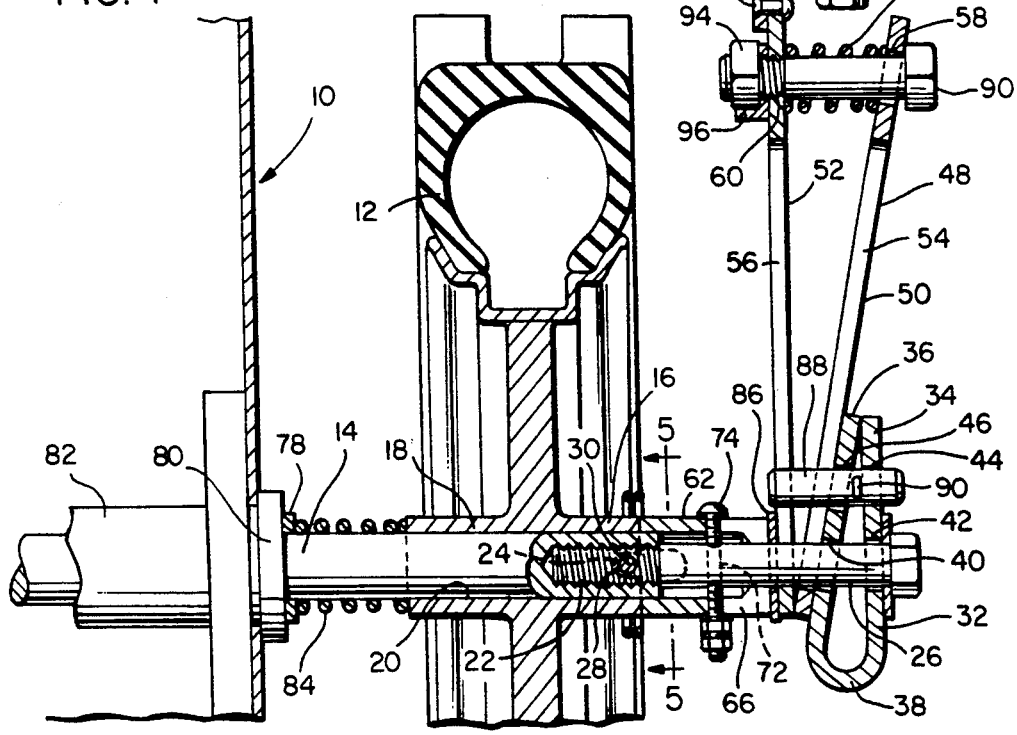

SNOW BLOWER WHEEL DISCONNECT

This is a divisional of application Ser. No. 07/681,743 filed Apr. 8, 1991 now U.S. Pat. No. 5,163,527.

BACKGROUND OF THE INVENTION

1. Field of the Invention

This invention relates to a disconnect structure between a transverse driving axle shaft of a vehicle and at least one of the opposite side driving wheels mounted o opposite ends of the driving axle shaft of the vehicle.

2. Description of Related Art

Various different forms of driving wheel disconnect structures have been provided for vehicles including opposite side driving wheels. Examples of these previously known structures are disclosed in U.S. Pat. Nos. 1,703,521, 1,734,718, 1,779,583, 2,547,695, 3,251,630, 4,144,944, 4,516,670, 4,836,320 and 4,895,210.

However, these previously known forms of driving wheel disconnect structures do not include the simplified wedge-type disconnect structure of the instant invention.

SUMMARY OF THE INVENTION

The wheel disconnect structure of the instant invention has been designed to be retrofitted to existing snow blowers and also to be incorporated into the manufacture of new snow blowers.

Most snow blowers include a transverse driveshaft upon whose opposite ends drive wheels are mounted merely by a diametric pin passing through the axle end and the outer side hub portion of the driving wheel. In this manner, the wheel may be readily removed when desired.

The main object of this invention is to provide a driving wheel disconnect for a snow blower or similar powered vehicle whereby one or either opposite side wheels of a powered two wheeled vehicle may be disconnected from the drive train to thereby allow the opposite side wheel to comprise the only driving wheel receiving drive torque and to enable the vehicle to readily execute a left or right turn when the vehicle is not engaged under power and a sharp turn to the non-driving wheel side of the vehicle when the vehicle is under driving power.

Another object of this invention is to provide a driving wheel disconnect which incorporates a minimum of structural components and wherein the structural components utilized are of simple design and readily fabricated.

Six points of scientific criteria were considered in the design of the instant invention. They are as follows:

1. Structural strength of the sliding wedge components maximized;
2. Maximizing mechanical travel on the axle within the minimized space available;
3. Minimizing travel distance of traction wheel while allowing sufficient clearance from drive pin and provide for adjustability of the components and allowance for wear;
4. Provision made for compression ratio of compensating spring to opposing compression from retraction spring which allows for wear and adjustability;
5. Ease of operation of sliding wedge with allowance for wear, adjustment and adjustability; and
6. Minimization of manufacturing costs of components.

Another very important object of this invention is to provide a driving wheel disconnect in accordance with the preceding objects and which ma be readily adapted for use in conjunction with various different types of vehicles using opposite side driving wheels which normally are locked on the same drive shaft and therefore are unable to rotate individually.

A final object of this invention to be specifically enumerated herein is to provide a driving wheel disconnect in accordance with the preceding objects and which will conform to conventional forms of manufacture, be of simple construction and easy to use so as to provide a device that will economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a typical form of snow blower having opposite side driving wheels which are normally driven at the same rotational speed and with the driving wheel disconnect structure of the instant invention operatively associated with the right hand driving wheel of the snow blower;

FIG. 2 is an enlarged fragmentary side elevational view of the rear, right hand portion of the snow blower shown in FIG. 1 and illustrating the driving wheel disconnect operatively associated with the right hand wheel of the snow blower;

FIG. 3 is a plan view of the assemblage illustrated in FIG. 2 as seen from the upper right hand portion of FIG. 2;

FIG. 4 is an enlarged sectional view taken substantially upon the plane indicated by the section line 4—4 of FIG. 2;

FIG. 5 a vertical sectional view taken substantially upon the plane indicated by the section line 5—5 of FIG. 4;

FIG. 6 is a perspective view of the thrust sleeve portion of the invention interposed between the sliding wedge of the invention and the outer end of the hub of the associated driving wheel;

FIG. 7 is an enlarged side elevational view of the operating control rod of the instant invention, the support bracket therefore and the lock mechanism for the control rod mounted from the support bracket, with parts of the upper end of the control rod and the handle therefore being broken away and illustrated in vertical section;

FIG. 8 is a fragmentary sectional view taken substantially upon the plane indicated by the section line 8—8 of FIG. 7;

DESCRIPTION OF THE PREFERRED EMBODIMENT

Figure 9:
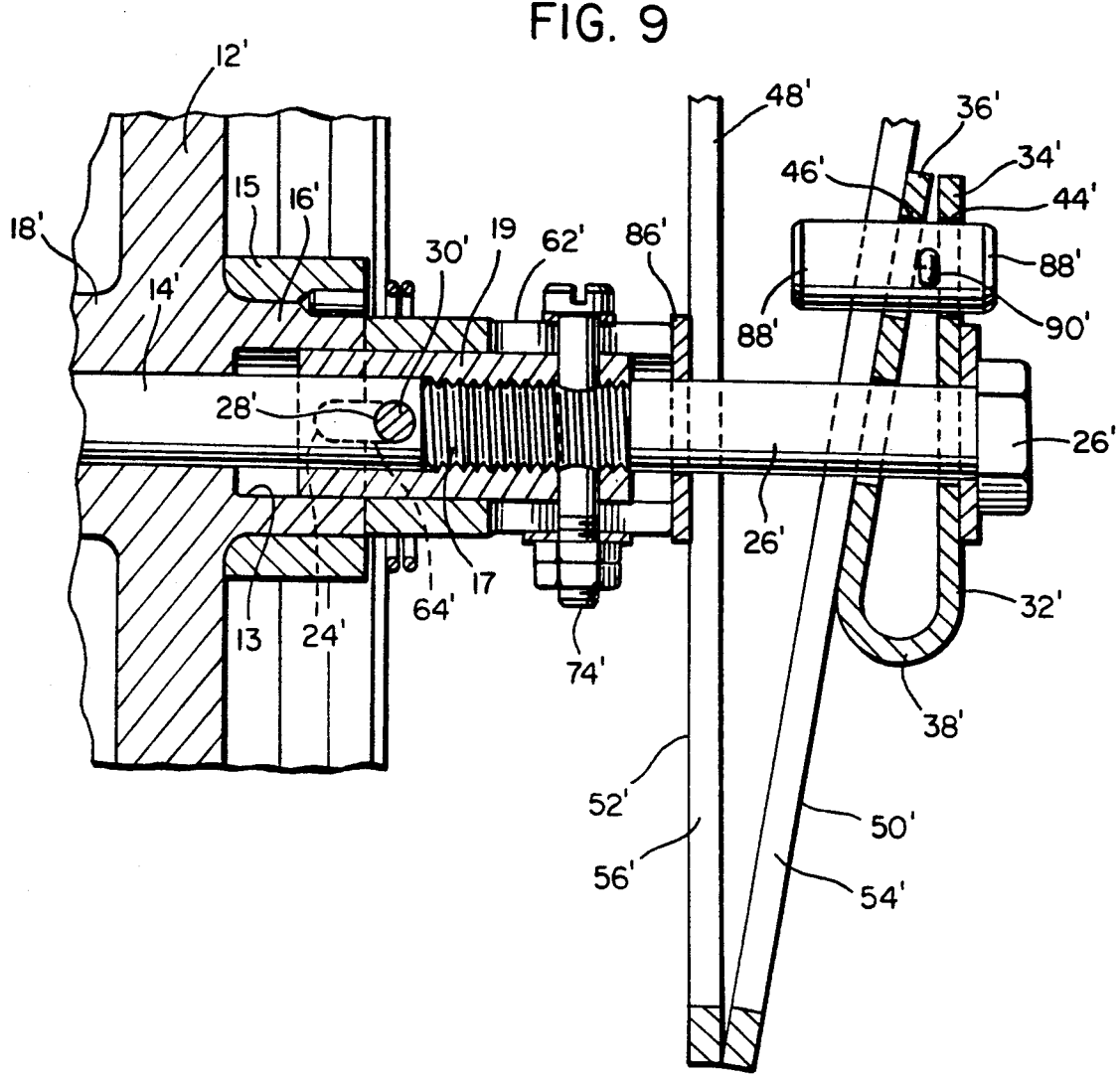
FIG. 9 is a fragmentary sectional view similar to FIG. 4 but illustrating a modified form of the invention to be used in conjunction with a driveshaft which is less than three-quarters of an inch in diameter.

Referring now more specifically to the drawings the numeral 10 generally designates a conventional form of commercially available snow blower including opposite side driving wheels and wherein only one driving wheel 12 is shown. The snow blower includes a transverse driven shaft 14 upon whose right end the wheel 12 is mounted. Usually, the right hand end of the driveshaft is provided with a diametric bore and the outside end 16 of the hub 18 of the wheel 12 is provided with lined radial bores registerable with the aforementioned diametric bore and a drive pin (of any suitable configuration) is passed through the radial bores and the diametric bore thereby drivingly connecting the driven shaft 14 to the wheel 12. Of course, the same structure also is used to drivingly connect the opposite side wheel (not shown) to the left hand end of the driven shaft 14.

The driven shaft 14 is smooth as is the interior of the bore 20 passing through the hub 18 and, accordingly, if the aforementioned pin was removed, the wheel 12 would not only be rotatable relative to the driven shaft 14 but also axially shiftable therealong.

With that form of the invention illustrated in FIGS. 1-7, the right hand end of the driven shaft 14 is provided with a blind, threaded axial bore 22 and the outer end 16 of the hub 18 is machined away sufficiently such that the previous radial bores formed therein are transformed into diametrically opposite radial slots 24 opening endwise outwardly of the outside end 16 of the hub 18.

A machine screw 26 is provided and includes a diametric bore 28 registerable with the radial slots and through which a removable pin 30 is receivable. In addition, a first wedge 32 is provided including a pair of arms 36 convergent toward one pair of corresponding ends and interconnected at the other pair of corresponding ends by an integral curved bight portion 38, the arms 34 and 36 having a first pair of registered bores 42 formed therethrough and a second pair of registered bores 44 and 46 formed therethrough. Also, a second wedge 48 is provided including a pair of elongated wedge plates 50 and 52 provided with longitudinal slots 54 and 56, respectively, and the plates 50 and 52 are convergent toward one pair of corresponding ends and are provided with registered bores 58 and 60 at the other pair of convergent ends thereof, the bore 58 being smooth and the bore 60 being threaded.

A thrust sleeve 62 is provided including first and second pairs of diametrically opposite radial slots 64 and 66 opening outwardly of first and second ends 70, the slots 64 and 66 lying upon diameters of the sleeve 62 disposed at 90 degrees relative to each other. It also will be noted that the bolt 40 includes a diametric bore 72 with which the radial slots 62 are alignable and an alignment and guide pin 74 may be secured through the slots 66 and the diametric bore 72. Further, the slots 64 are wider than the slots 66.

In order to convert the snow blower 10, the original diametric pin keying the wheel 12 to the right end of the driven shaft 14 is removed along with the wheel 16. A washer 78 is then disposed on the driven shaft 14 against the shoulder 80 of a bushing 82 through the driven shaft 14 is rotatably received and a compression spring 84 is thereafter disposed on the driven shaft 14 outwardly of the washer 78. Assuming that the outside end 16 of the hub 18 already has been machined partly away and that the threaded blind bore 22 has been formed in the terminal end of the driven shaft 14, the hub 18 of the wheel 12 is then placed upon the shaft afterwhich the bolt after having been passed through the bores 40 and 42 and the slots 56 as well as a washer 86 and the thrust sleeve 62 is threaded into the blind bore 22 and locked into position therein by the removable pin 30. The pin 74 is thereafter secured through the slot 66 and the bore 72. A guide pin 88 is passed through the bores 44 and 46 as well as the slots 54 and 56 and a retainer in the form of a cotter pin 90 is secured through a diametric bore (not shown) formed in the pin 88 with the cotter pin 90 disposed between the arms 34 and 36. Thereafter, a bolt 90 is passed through the bore 58 and threaded into the bore 60 with a compression spring 92 being disposed about the bolt 90 between the wedge plates 50 and 52 and a jam nut 94 is threaded onto the threaded end of the bolt 90 outwardly of a locking ear tab equipped washer 96.

The upper end of the wedge plate 56 has a right angle bracket 100 secured thereto in any convenient manner such as by rivets 102 and a bolt 104 secures the lower end of a operating rod 106 to the bracket 100. The upper end of the operating rod 106 is notched as at 108, has an adjustable abutment sleeve 110 mounted thereon and a tubular handle is mounted on the upper terminal end of the rod 106 through utilization of a threaded bolt 114. The operating rod 106 passes through a guide bore 116 formed in a mounting plate 118 forming one leg of a L-shaped support bracket 120 mounted from the rearwardly and upwardly projecting handle 122 of the snow blower 10 through the utilization of suitable fasteners 124. A latching lever 126 is pivotally mounted from the mounting plate 118 by a pivot fastener 128 and includes an operating handle 130 on its free end, the latching lever 126 being engagable in the notch 108 to retain the rod 106 in a fully upwardly displaced position with the second wedge 48 in its fully upwardly displaced inoperative position illustrated in FIG. 4.

In operation, when it is desired to declutch the wheel 12 from the right hand end of the driven shaft 14, the latching lever 126 is swung away from the rod 106 and the rod 106 is depressed downwardly until the abutment sleeve or collar 110 abuts the mounting plate 108. In this position, the second wedge 48 is displaced downwardly relative to the first wedge 32 between the arm 36 and the washer 86 and exerts a yieldable axial thrust on the thrust sleeve 62. This yieldable thrust is operative, over a period of time during no more than one rotation of the wheel 12, to axially displace the hub 18 to the left as viewed in FIG. 4 against the biasing action of the spring 84 to a position with the outside end of the hub 16 disposed to the left of the pin 30 and the pin 30 received within the slots 64 of the drive sleeve 62. At this point, the driven shaft 14 drives the drive sleeve 62, but is ineffective to drive the hub 18 of the wheel 12. Thus, only the left hand wheel (not shown) of the snow blower 10 receives driving torque from the driven shaft 14 and the snow blower 10 may be readily turned to the right, and is even readily turned to the left.

If the snow blower 10 is to execute a 180 degree turn, shortly before the 180 degree turn is accomplished, the tubular handle 12 has an upward force applied thereto in order to upwardly retract the second wedge 48 and allow the locking lever 126 to again be engaged in the notch 108. Thereafter, during no more than one half revolution of the wheel 12 the compression spring 84 will bias the hub 18 back to the right as viewed in FIG. 4 and against the pin 30 until the pin 30 registers with the radial slots 24 and is received therein. Of course reception of the pin 30 within the slots 34 reestablishes the drive connection between the driven shaft 14 and the hub 18 of the wheel 12.

As herein before set forth, only one of the wheel disconnect assemblies of the instant invention may be operatively associated with a selected wheel of the snow blower 10. On the other hand, a pair of wheel disconnect structures may be provided and operatively associated with both opposite side drive wheels of the snow blower 10.

Figure 10:
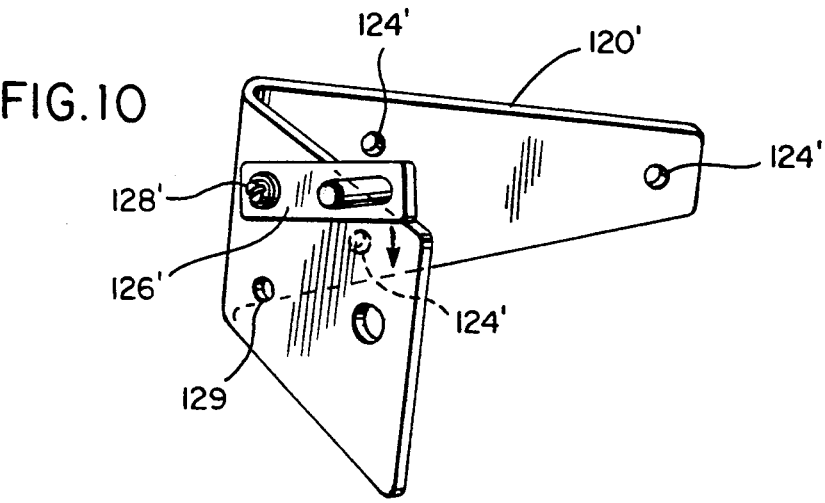
FIG. 10 is a fragmentary perspective view of a modified form of control rod support bracket and lock therefore.

With attention now invited more specifically to FIGS. 9 and 10 of the drawings, there may be seen a modified form of the invention wherein the driven shaft 14' thereof corresponding to the driven shaft 14 is of a diameter too small to be provided with a blind bore such as the blind bore 22 of sufficient size. In this instance, the outside end 16' of the wheel 12' is provided with a counter bore 13 and the exterior of the outside end 16' of the hub 18' is provided with an outer reinforcing sleeve 15. Also the extreme right hand end of the driven shaft 14 is externally threaded as at 17 and an inner sleeve 19 is threaded onto the threaded end 17 of the driven shaft 14' and snugly but rotatably received within the counter bore 13. The thrust sleeve 62' is substantially identical to the thrust sleeve 62 and a pin 30' corresponds to the pin 30 and is receivable in the slots 64' of the thrust sleeve 62', through a bore 28' corresponding to the bore 20 also receivable within radial slots 24' formed in the outside end 16' of the hub 18'. Otherwise, the structure illustrated in FIG. 9 is substantially identical to the structure illustrated in FIG. 4 and has various components thereof referred to by prime reference numerals corresponding to the reference numerals utilized in FIG. 4. Of course, the second wedge 48' illustrated in FIG. 9 is in the fully downwardly depressed position such that the hub 18' has been displaced to the left as viewed in FIG. 9 in order to disengage the shaft 14' from the hub 18', whereas the second wedge 48 illustrated in FIG. 4 is in its uppermost position with the shaft 14 drivingly connected to the hub 18 of the wheel 12.

Referring now more specifically to FIG. 10, a modified form of bracket 120' is provided. The bracket 120' is substantially similar to the bracket 120 except that two upper mounting bores 124 are provided to be alternately used in conjunction with the single lower mounting bore 124' in conjunction with the fasteners 124' illustrated in FIG. 1. In addition, the locking lever 126' is of slightly different configuration and can be mounted, through the utilization of a fastener 128' corresponding to the fastener 128, either in the manner illustrated in FIG. 10 or with the fastener 128' secured through a second aperture 129 provided therefore. The multi position bracket 120' is provided to enable the bracket 120 to be mounted on either side of the handle 122 for declutching either the right hand wheel 12 or the opposite side wheel (not shown), the design feature of FIG. 10 allows for lower manufacturing costs, whereas only one bracket need be manufactured and stocked. A unique design characteristic of the instant invention is that it can be mounted on either the right or left side of the machine which may best suit elderly persons needs, or individuals who are partially, physically impaired and have better dexterity with one hand a opposed to the other, or for persons who would rather install the device on their dominant handed side.

However, the structure illustrated in FIG. 9 operates in substantially the same manner as the structure illustrated in FIG. 4. The FIG. 9 structure is only slightly different to compensate for a driven shaft 14' which is too small in diameter to have a bore as large as the bore 22 formed therein.

Because of the resiliency of the wedges 48 and 48', as opposed to the relative stiffness of the wedges 32 and 32', the operating rods therefore may be fully downwardly actuated with a relatively light force and the associated compression springs (92 for the wedge 48) are then operative during subsequent rotation of the wheels 12 and 12' to inwardly shift the latter along the shafts 14 and 14' to thereby declutch the associated wheels 12 and 12'. Because the resiliency of the wedges 48 and 48, allows the wedges to be so easily downwardly displaced toward their actuated positions, no portions of the associated shafts 14 and 14', the thrust sleeves 62 and 62' or the machine screws 26 and 26' as well as the inner sleeve 19 are subject to excessive lateral thrust which might tend to bend the shafts 14 and 14' or the machine screws 26 and 26'. Furthermore, the internal threads at 22 and 17 are not subject to excessive forces which might tend to strip the same. When the wedge 48 is first downwardly displaced, the spring 92 is compressed and the wheel 12 is partially shifted to the left as viewed in FIG. 4 against the biasing action of the spring 84 while the tread of the tire on the wheel remains stationery on the floor. Then, as the drive of the snow blower 10 is engaged and the wheel 12 begins to turn, the greater force of the spring 92 over the force of the spring 84 causes the wheel 12 to shift further toward the left in order to be declutched from the shaft 14.

Accordingly, it has been determined that the resiliency of the wedge 48 (and also the wedge 48') temporarily absorbs up to 30 percent of the wedge pressure load to prevent structural damage such as above referred to. In addition, the resiliency of the wedge 48 allows the wedge to travel downwardly past the position thereof it would be in if the wedge was rigid and the wheel 12 is in a position fully declutched from the shaft 14. Thus, adjustment of the operating rod 106 or the wedge 48 is not required since slight adjustments which would otherwise be required ar compensated for by the spring 92. In addition, the resilient wedge 48 rotatably receives the machine screw 26 therethrough in a manner which results in only normal wear over long periods of operation without frequent maintenance requirements. The resilient wedge 48 further performs the critical mechanical functions of the invention in a manner ensuring high operating performance without failure of any of the parts of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A flexible, elongated wedge for lengthwise wedging between two opposing surfaces to be yieldingly wedged away from each other, said wedge including a pair of laterally registered, elongated members including first and second pairs of corresponding ends, means joining one pair of said ends against separation, said members being divergent toward the other pair of said ends shank-type fastener means extending between said other pair of ends limiting movement of said other pair of ends away from each other and along which at least one end of said other pair of ends is slidable toward the other end of said other pair of ends, and resilient means disposed between said other pair of ends yieldingly resisting movement of said other pair of ends toward each other.

2. The flexible, elongated wedge of claim 1 wherein said resilient means comprises a compression spring disposed about said shank-type fastener between said other pair of ends.

3. A yieldable, elongated wedge for lengthwise wedging between two opposing surfaces to be wedged away from each other, said wedge including a pair of laterally registered elongated members including first and second pairs of corresponding ends, said elongated members being convergent toward said first ends and divergent toward said second ends, shank-type fastener means extending between said second ends limiting movement of said second ends away from each other and along which at least one of said second ends is movable toward the other of said second ends, and resilient means operably connected between said second ends yieldingly biasing said second ends apart.

4. The wedge of claim 5 wherein said elongated members included registered longitudinal slots formed therein, an elongated support member disposed generally normal to said wedge and in a plane containing said elongated members extending through and slidable along said slots.

5. The wedge of claim 4 including a guide member supported from and in laterally spaced relation relative to said support member and projecting through and longitudinally slidable in at least one of said slots.

6. The wedge of claim 5 wherein said guide member and elongated members are mounted from said support member for angular displacement relative thereto about the center axis of said elongated support member.

* * * * *